(12) United States Patent
Sugata

(10) Patent No.: US 6,246,128 B1
(45) Date of Patent: Jun. 12, 2001

(54) ATTACHMENT ASSEMBLY FOR A STEERING WHEEL OF A VEHICLE

(75) Inventor: Shoichi Sugata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/330,801

(22) Filed: Jun. 11, 1999

(30) Foreign Application Priority Data

Jun. 15, 1998 (JP) .................................................. 10-167543

(51) Int. Cl.[7] ...................................................... B60L 1/00
(52) U.S. Cl. ........................................ 307/10.1; 200/61.54
(58) Field of Search ......................... 307/10.1; 200/61.54

(56) References Cited

U.S. PATENT DOCUMENTS

| | | | |
|---|---|---|---|
| 4,393,280 | * 7/1983 | Iwata et al. ............................... | 200/4 |
| 5,724,907 | * 3/1998 | Castellucci ........................ | 114/144 R |
| 5,847,342 | * 12/1998 | Uchiyama et al. ................ | 200/61.54 |
| 6,008,457 | * 12/1999 | Klein et al. ........................ | 200/61.54 |

FOREIGN PATENT DOCUMENTS 0771693   7/1997  (EP) .

* cited by examiner

*Primary Examiner*—Josie Ballato
*Assistant Examiner*—Sharon Polk
(74) *Attorney, Agent, or Firm*—Bierman, Muserlian and Lucas

(57) ABSTRACT

An attachment assembly for use in connection with the steering wheel of a vehicle. It consists of a fixed body, attached to the steering column, and a movable body, rotatable with respect to the fixed body and affixed to the steering wheel. The movable body and fixed body together define a toroidal space in which a coiled flat cable is contained. The ends of the cable carry connectors from the electrical system of the vehicle to (for example) an air bag actuating mechanism. A cable reel, made up of the fixed and movable bodies and the flat cable, is inserted into a hollow space in the switch body and is affixed thereto. As a result, the switch body and its operating lever can be maintained close to the underside of the steering wheel, even if the height of the flat cable is substantially increased. This permits the operation of the switches which are part of the switch body while the driver's hands remain on the rim of the steering wheel.

6 Claims, 7 Drawing Sheets

ATTACHMENT ASSEMBLY FOR A STEERING WHEEL OF A VEHICLE

This Application claims the benefit of the priority of Japanese 10-167543, filed Jun. 15, 1998.

The present Invention is directed to an attachment assembly for cable reels and combination switches which are mounted adjacent the steering wheel of a vehicle. More specifically, the Invention is directed to a structure which permits the operating ends of actuating levers to be mounted close to the underside of the steering wheel. As a result, the levers can be moved without the necessity of removing the driver's hands from the wheel.

BACKGROUND OF THE INVENTION

The steering wheel of a vehicle includes an air bag and an inflator which is capable of causing it to expand. A cable reel is used to connect the inflator to the vehicle's electrical circuits.

Referring to FIGS. 7 to 9, movable body 5 is rotatably mounted on fixed body 2 with a cylindrical space therebetween. Cable reel 1, including coiled flat cable 6, is in the space between fixed body 2 and movable body 5. The cylindrical space between the movable body and the fixed body has a sufficient radius so that flat cable 6 can coil and uncoil in response to rotation of movable body 5. The fixed body is mounted on combination switch body 3 which, in turn, is on steering column 4 adjacent steering wheel 10 and movable body 5 rotates with steering wheel 10.

Combination switch body 3 carries turn indicator member 7 on one side and light switch member 8 on the other. They are actuated by operating lever 7b extending from switch box 7a and operating lever 8b extending from switch box 8a, respectively.

The foregoing device is assembled by fixing movable body 5, carrying cable reel 1 to the steering column 4 beneath steering wheel 10. Fixed body 2, with rotatably mounted movable body 5, is attached to the upper surface of switch body 3 and below steering wheel 10. When the device of the foregoing type is assembled, cable reel 1 is interposed between steering wheel 10 and the upper surface of switch body 3 which, in turn, is fixed to steering column 4. operating levers 7b and 8b extend from either side out of switch boxes 7a and 8a.

When cable reel 1 is between steering wheel 10 and switch body 3, from which operating levers 7b and 7a project, the height H is quite large and thus, the operating levers are separated from steering wheel 10 by a substantial distance S. This is of particular importance because recent innovations require more circuits to be carried by flat cable 6. As a result, cable reel 1 has increased to about 1.5 to 2 times the prior height. When distance S between steering wheel 10 and operating levers 7b and 8b is increased in accordance with the foregoing, the driver can no longer actuate the operating levers without releasing the steering wheel. For safety reasons, this is undesirable.

In an effort to solve the foregoing problem, it has been suggested that operating levers 7b and 8b be bent as shown in broken lines in FIG. 7 and in full lines in FIG. 10. This brings the ends closer to steering wheel 4, thereby reducing distance S. However, this solution has the drawback of requiring a special bent shape for the operating levers which involves increased costs. In addition, the bent levers create problems for the circuits contained therein.

An additional mechanism is used to automatically return the turn indicator lever and switch to their neutral position. Since cancel cam 9 is the element which effectuates this as steering wheel 10 is rotated, the former must be disposed at the attachment position of operating lever 7b. As a result, it is an increased distance from steering wheel 10. Therefore, the various elements comprising cancel cam 9 must be installed separately from the remainder of the device. The number of parts and the number of steps required for assembly are both increased.

Another solution is based upon Japanese OPI 9-129092. As shown in FIG. 11, fixed body 2' is formed directly from combination switch body 3'. Movable body 5' rotates relative to switch body 3' and forms a ring-shaped space with switch body 3'. Flat cable 6' is located therein.

The foregoing is an improvement on the other prior art mentioned, and allows operating levers 7b and 8b to be closer to steering wheel 10. However, since switch body 3' doubles as the fixed body for the cable reel, and the cable reel and combination switch are formed integrally, a problem arises. Specifically, should one of the bodies be damaged (e.g. cracked, chipped, or deformed) both the cable reel and the combination switch must be replaced.

In addition, cancel cam 9' is disposed below fixed body 2'. This requires that the cam parts be installed separately from one another. Moreover, the operating lever for the turn indicator switch is substantially below steering wheel 10. This is particularly true if flat cable 6 is of increased height as is the current trend. Thus, the operating lever will still be farther away from steering wheel 10 than is optimally desirable.

BRIEF DESCRIPTION OF THE INVENTION

It is an object of the present Invention to overcome the foregoing problems. The cable reel is separate from the combination switch, so that the distance between the steering wheel and the operating levers need not be increased, even if the height of the cable increases. This permits the driver to actuate the operating levers while continuing to hold the steering wheel. Since the cancel cam does not need to be a separate member, the number of parts is reduced.

SUMMARY OF THE INVENTION

The present Invention provides an attachment assembly, for use in connection with the steering wheel of a vehicle, which includes a fixed body and a movable body mounted thereon and rotatable with respect thereto. The fixed body and movable body together define a ring-shaped hollow section between each other. A coiled flat cable is located in the hollow section with an upper connection at one of its ends and a lower connection at the other end. The fixed body, movable body, and flat cable form the cable reel.

There is a combination switch body, having a center opening in its upper plate, which carries a first operating lever on one side of the switch body and preferably a second operating lever on the other side of the switch body. The cable reel is at least partly within the center opening and releasably fixed to the switch body. The depth of penetration into the center opening is not critical, the deeper the cable reel is inserted, the lower the overall height will be, so long as the cable reel does not project from the other side.

In the usual case, the first operating lever will actuate a turn indicator. The lever (and the switch which it controls) will have a right turn signaling position, a left turn signaling position, and a neutral position located between the first two. The lever is moved from the neutral position to either of the other two positions manually; however, it is desirable that, when the steering wheel is reversed to straighten the wheels, the lever be returned to its neutral position. This is accomplished by a cancel cam which is located either on the exterior surface of the movable body or on the internal surface of the fixed body. The cam comprises a pair of arcuate cam surfaces which are spaced apart circumferentially from each other. They are positioned so that they will ride over the release mechanism as the wheel is turned so as to turn the vehicle in the desired direction and to trip the release mechanism as the wheel is straightened out. It has been found desirable to locate the cancel cam either within the hollow space or adjacent thereto as part of the movable body. It is also preferable that the center opening be circular.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
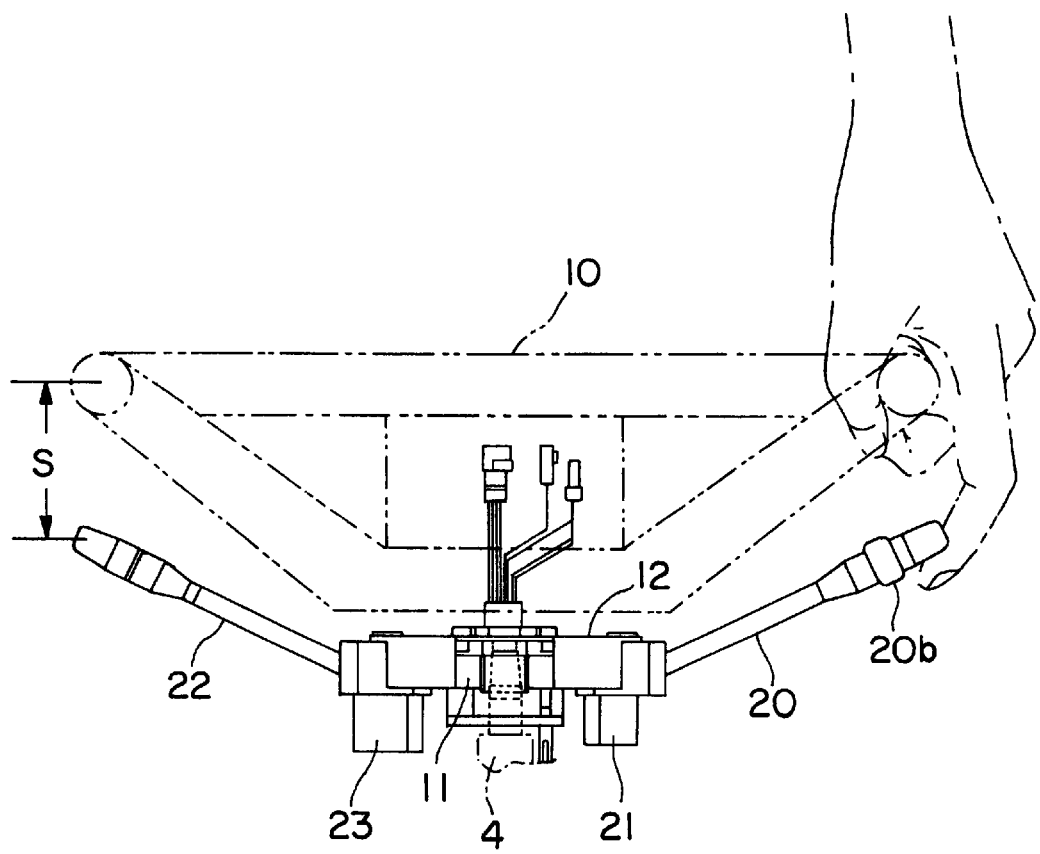
FIG. 1 is an elevation, partly schematic and in section of the assembly of the present Invention.

The attachment assembly of the present Invention comprises cable reel 11 and combination switch body 12. Cable reel 11 includes movable body 13, flat cable 16 and fixed body 14. Switch body 12 carries switch boxes 21 and 23 which are actuated by operating levers 20 and 22, respectively.

Figure 2:
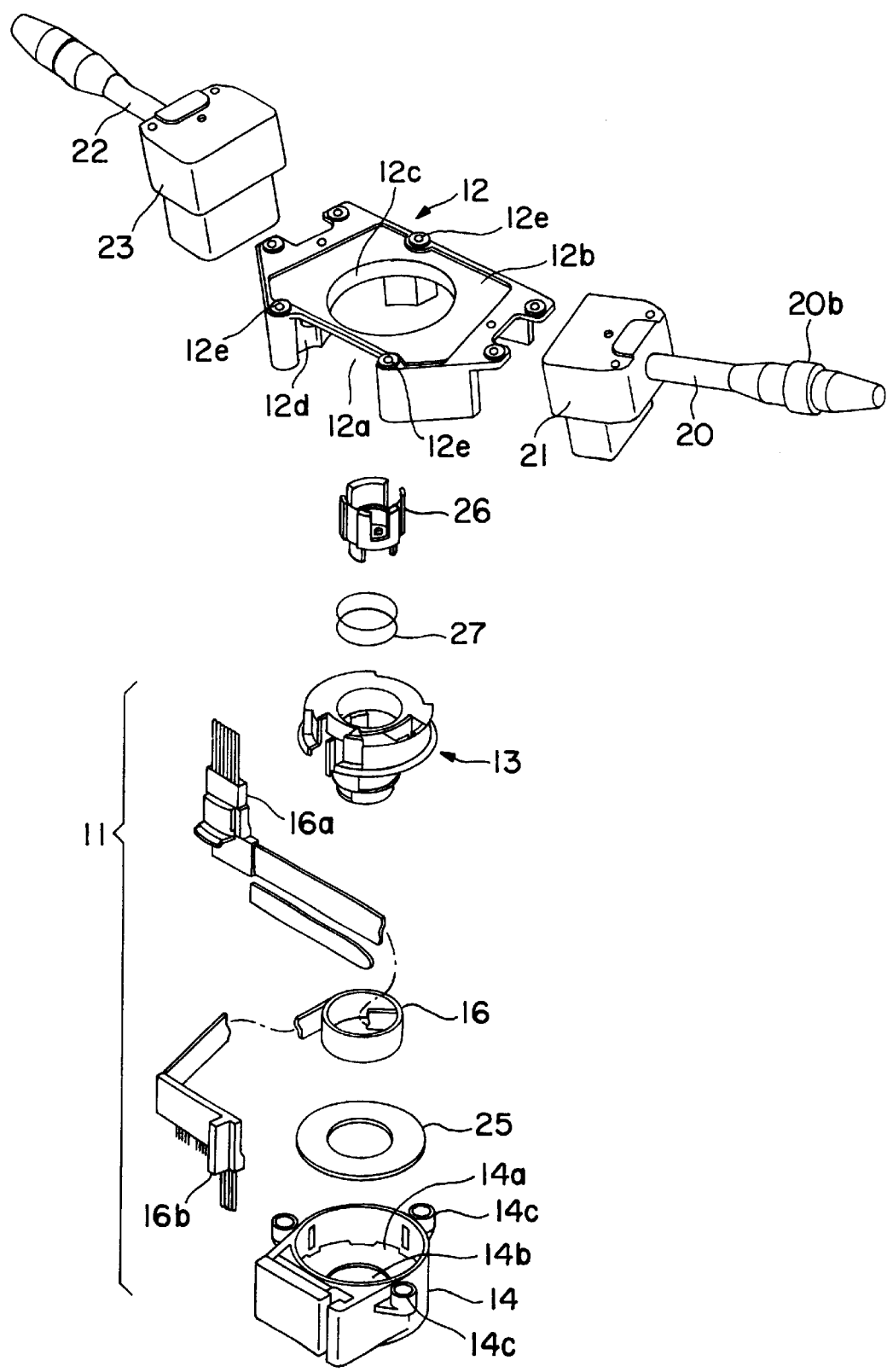
FIG. 2 is an exploded perspective view of the Invention.

As shown more particularly in FIG. 2, fixed body 14 of cable reel 11 is provided with bottom surface 14a having opening 14b. Three bolt receivers 14c are provided for connection to switch body 12. Lubricating ring 25 is inserted between flat cable 16 and bottom surface 14a. Flat cable 16 is provided with upper connector 16a at one end and lower connector 16b at the other. Movable body 13 is located on top of flat cable 16 and is complementary to fixed body 14.

The upper end of cable reel 11, with linking unit 26 and spring 27, is inserted into circular opening 12c in upper plate 12b and includes hollow space 12a adapted to receive the rest of cable reel 11. Side walls 12d are provided with bolt holes 12e which correspond to bolt receivers 14c of fixed body 14. Bolts passing through bolt holes 12e and bolt receivers 14c secure the elements of the assembly together.

Switch body 12 carries switch boxes 21 and 23 which are actuated by operating levers 20 and 22, respectively. The switch in switch box 21 is adapted to actuate the turn indicator when end 20b is manually moved from its neutral position in an appropriate direction to signal a right or left turn.

Figure 3:
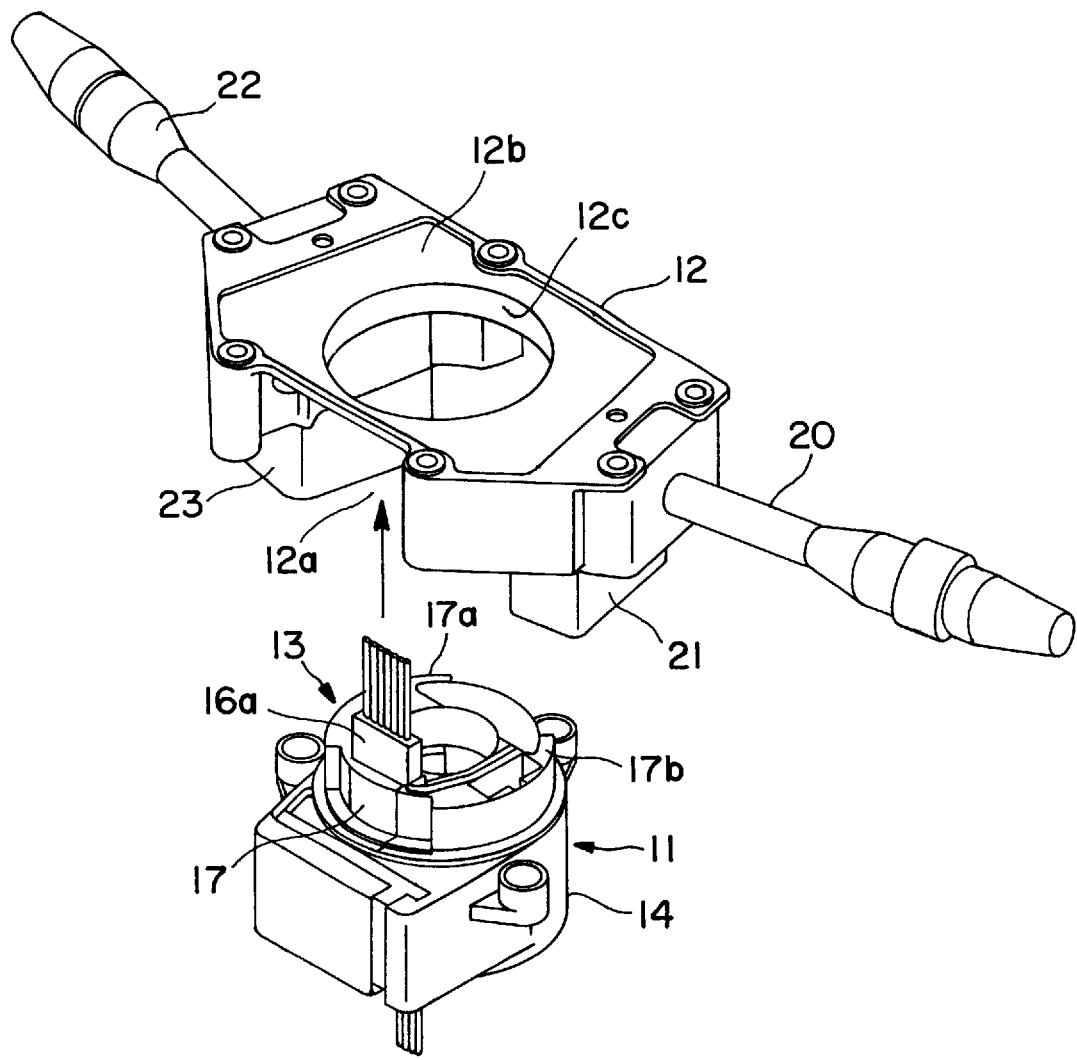
FIG. 3 is a partially exploded view of the Invention with the cable reel assembled.

Movable body 13 is connected to steering wheel 10 and rotates with it with respect to fixed body 14. Assembled cable reel 11 is shown in FIG. 3. Cancel cam 17, comprising cam surfaces 17a and 17b, actuates release 20a which retains operating lever 20 in either its right turn or left turn position so that it can return to its neutral position. The release takes place as the wheels of the vehicle are returned to their straight position by rotation of steering wheel 10.

Figure 4:
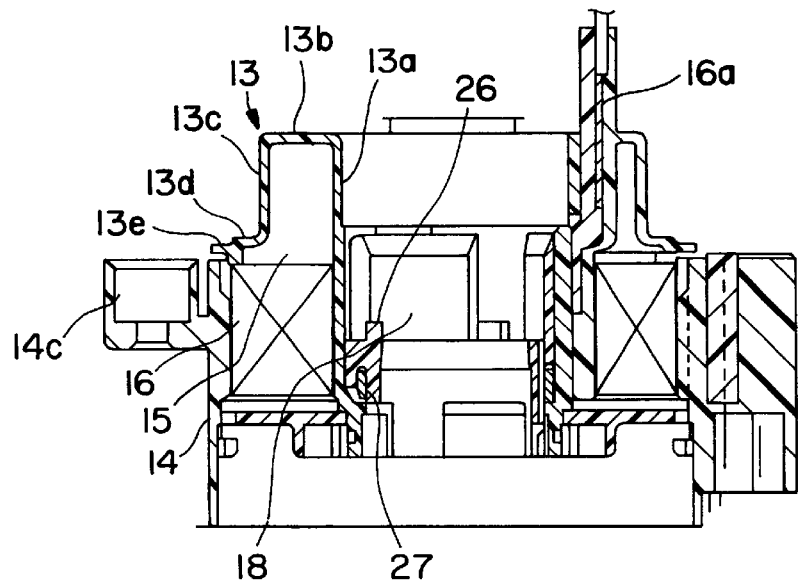
FIG. 4 is a cross section of the assembled cable reel.

Assembled cable reel 11 of FIG. 3 is shown in cross section in FIG. 4. Movable body 13 has inner perimeter 13a, ring section 13b, outer perimeter 13c, and shoulder 13d. The shoulder rests on fitting piece 13e which acts as a seat for the movable body. Inner perimeter 13a forms core 18. Between core 18 and fixed body 14 is toroidal space 15. Flat cable 16 rests therein.

Figure 5:
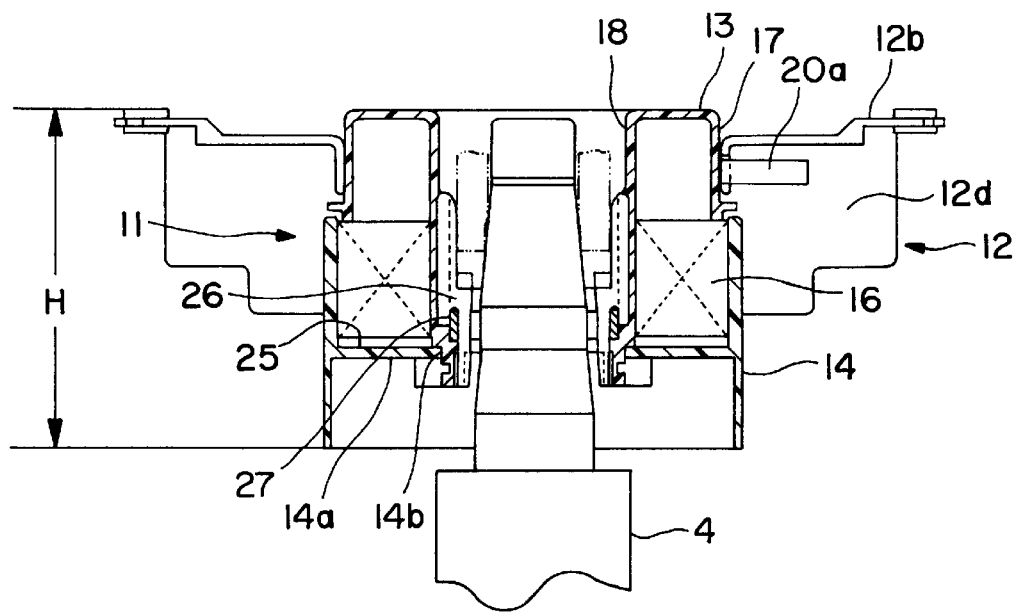
FIG. 5 is a cross section of the cable reel of FIG. 4 assembled with the combination switch.
Figure 6:
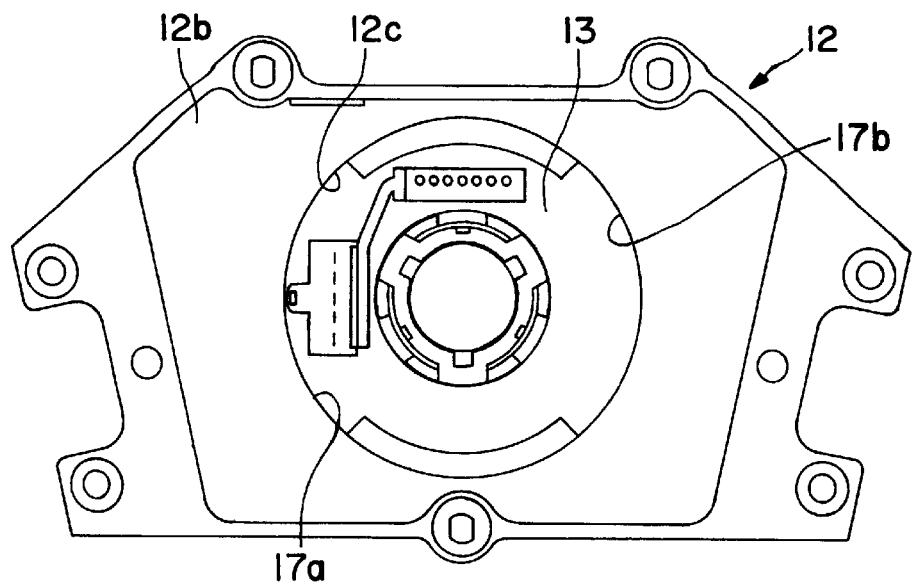
FIG. 6 is a plan view of the device as shown in FIG. 5.
Figure 7:
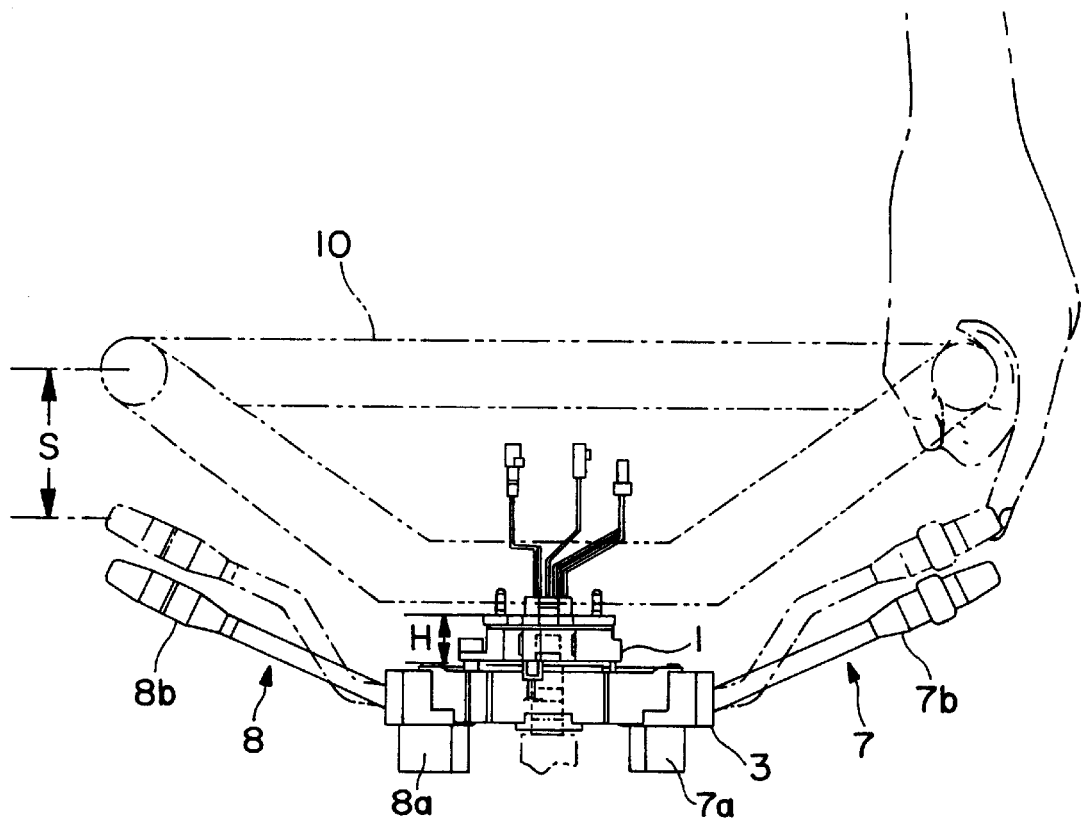
FIG. 7 is a view, similar to that of FIG. 1, of a prior art device.
Figure 8:
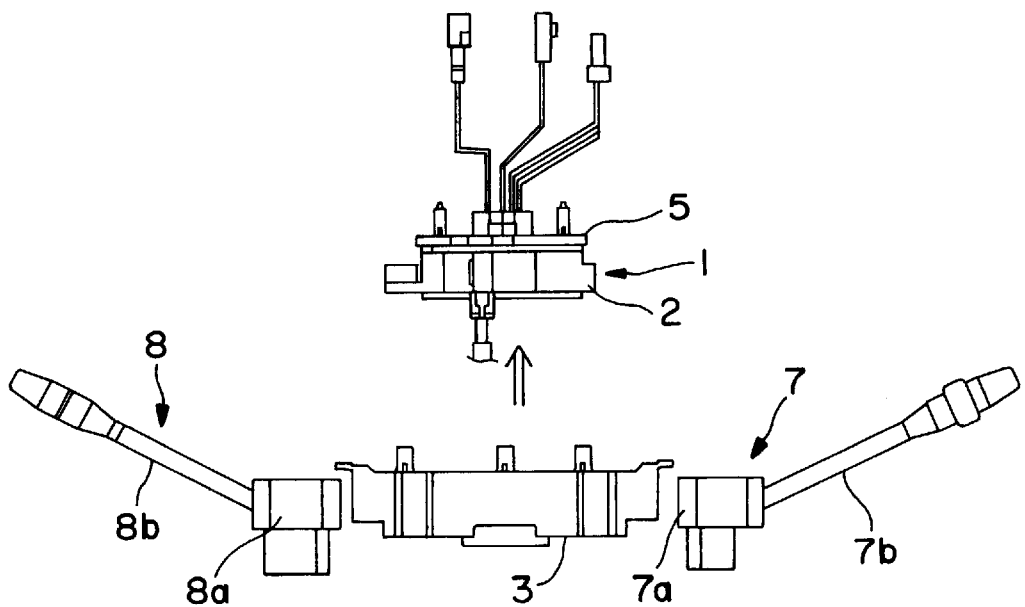
FIG. 8 is an exploded view of the device of FIG. 7.
Figure 9:
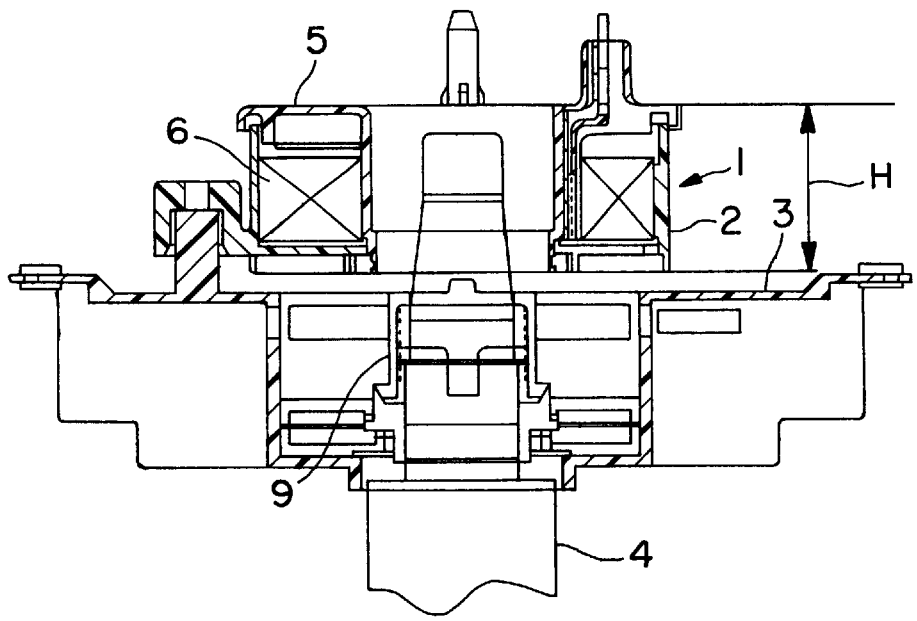
FIG. 9 is a schematic cross section of FIG. 7.
Figure 10:
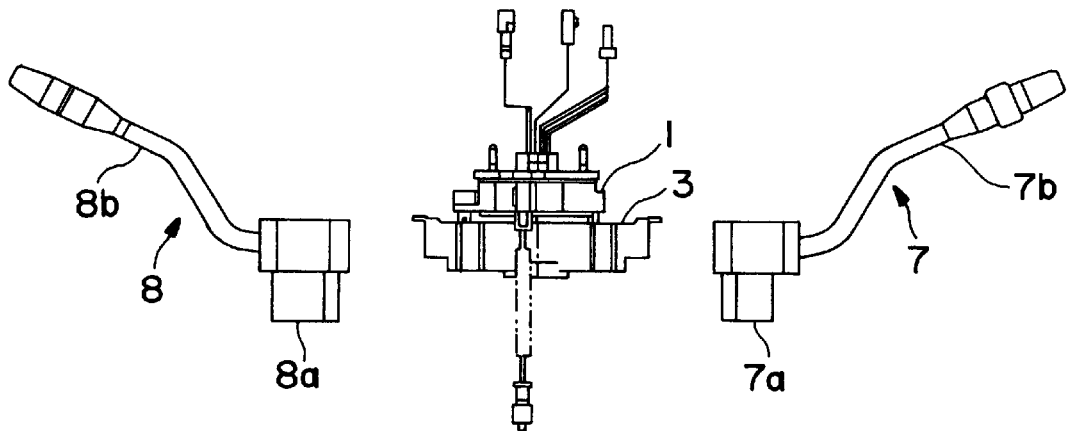
FIG. 10 is an exploded view of another known device.
Figure 11:
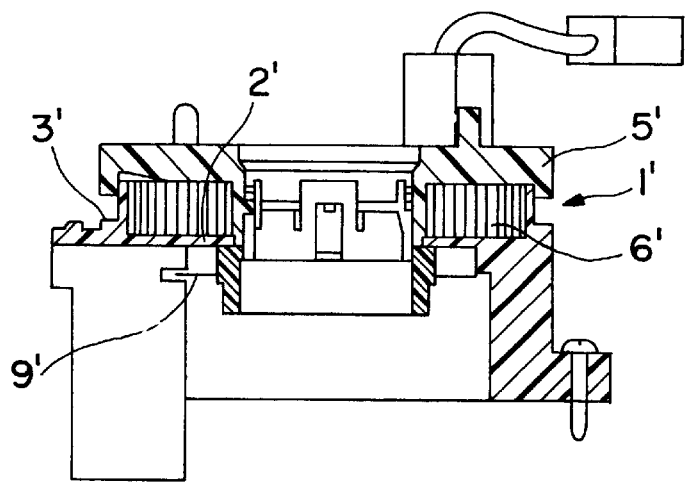
FIG. 11 is a cross section of another known device.

The completely assembled device is shown in FIG. 5. Cable reel 11 is mounted within the hollow space of switch body 12. The entire assembly is secured to steering column 4. Because cable reel 11 is set within switch body 12, height H is minimized. As a result, as shown in FIG. 1, switch box 21 is located close to steering wheel 10 so that operating lever 20 can be actuated while the hands of the driver remain on the wheel. Moreover, operating lever 20 can be straight, a shape which is more economical to manufacture.

In accordance with the present Invention, the cable reel and combination switch are formed independently and the former is inserted into the hollow space in the latter from below, thereby fixing the cable reel to the upper plate of the switch body. In this manner, the position of the operating lever on the switch body is largely unaffected by the height of the flat cable and/or the cable reel. Furthermore, since the cable reel and switch body are separate units, if one of them is defective, it is not necessary to replace both. The cancel cam is disposed on the outer perimeter surface of the movable body, thereby reducing both the number of parts and the number of assembly steps, thus reducing costs significantly.

Although only a limited number of embodiments of the present Invention have been expressly disclosed, it is, nonetheless, to be broadly construed, and not to be limited except by the character of the claims appended hereto.

What is claimed is:

1. An attachment assembly for use with a steering wheel of a vehicle comprising a fixed body and a movable body, rotatable with respect thereto, mounted thereon, said movable body having a core, said fixed body having a periphery, said movable body and said fixed body defining a toroidal space between said core and said periphery, a coiled flat cable contained in said toroidal space, an upper connection at one end of said cable and a lower connection at another end of said flat cable, said fixed body, said movable body, and said flat cable comprising a cable reel;

a combination switch body having an upper plate with a center opening and a hollow space therein, there being a first operating lever on one side of said switch body, said cable reel at least partly in said hollow space and affixed to said switch body.

2. The assembly of claim 1 wherein there is a second operating lever on another side of said switch body.

3. The assembly of claim 1 comprising a cancel cam on an exterior surface of said movable body or on internal surface of said fixed body, said cam adapted to actuate a release mechanism to allow said first lever to move from an operative position to an inoperative position.

4. The assembly of claim 1 wherein said first lever actuates a turn indicator.

5. The assembly of claim 1 wherein said center opening is circular.

6. The assembly of claim 3 wherein said cancel cam comprises a pair of arcuate cam surfaces, said cam surfaces being spaced apart circumferentially from each other.

* * * * *